United States Patent
Andrisano

[11] 3,911,015
[45] Oct. 7, 1975

[54] SUBSTITUTED ALKANOL-THIO-ALKYLAMINES AND SALTS THEREOF

[76] Inventor: Renato Andrisano, 8, via Toscanini, 40136 Bologna, Italy

[22] Filed: Feb. 5, 1973

[21] Appl. No.: 329,563

Related U.S. Application Data

[63] Continuation-in-part of Ser. No. 141,431, May 7, 1971, abandoned, and a continuation-in-part of Ser. No. 141,432, May 7, 1971, abandoned.

[30] Foreign Application Priority Data

May 18, 1970 Italy ............................. 3453/70
May 18, 1970 Italy ............................. 3454/70

[52] U.S. Cl. ................ 260/570.5 S; 260/566 F; 260/570.5 C; 260/570.6; 260/592; 260/599; 260/609 R; 424/330
[51] Int. Cl. ............................................ C07c 93/06
[58] Field of Search ............... 260/570.5 S; 424/330

[56] References Cited
UNITED STATES PATENTS

| | | | |
|---|---|---|---|
| 3,056,836 | 10/1962 | Moed | 260/570.6 |
| 3,278,601 | 10/1966 | Moed | 260/570.6 |
| 3,501,769 | 3/1970 | Crowther et al. | 260/570.5 X |
| 3,732,300 | 5/1973 | Lunts et al. | 260/559 |

Primary Examiner—R. V. Hines

[57] ABSTRACT

The present invention relates to novel substituted alkanol-thio-alkylamines and their salts, having the general formula

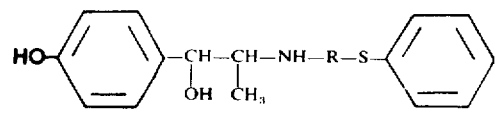

wherein R represents an alkylene group containing from 2 to 3 carbon atoms. The novel compounds show therapeutical properties, in particular a peripheral vasodilatory and hypotensive activity in addition to other valuable therapeutical properties. Their toxicity is low. According to another aspect of the invention the novel substituted alkanol-thio-alkylamines are obtained by reaction of an amine with a carbonyl compound, followed by hydrogenation of the intermediate formed Schiff base. Alternatively the products of the invention are obtained by condensation of an amine with a proper halogen-containing compound in the presence of an acid binding agent.

5 Claims, No Drawings

SUBSTITUTED ALKANOL-THIO-ALKYLAMINES AND SALTS THEREOF

CROSS REFERENCES TO RELATED APPLICATIONS

This is a continuation in part of my copending applications Ser. No. 141,431 filed on May 7, 1971 and Ser. No. 141,432 filed on May 7, 1971 and now both abandoned.

DETAILED DESCRIPTION OF THE INVENTION

The present invention relates to novel substituted alkanol thio-alkyl-amines, and salts thereof as well as the pharmaceutical preparations containing them. The invention also relates to the methods for preparing same. The compounds according to the present invention have the following formula:

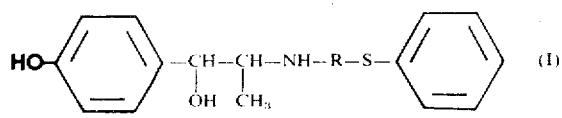

wherein R represents a group selected from —CH$_2$—CH$_2$—, —CH$_2$—CH$_2$—CH$_2$— and

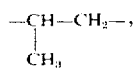

and salts thereof.

The compounds according to the present invention are novel pharmacologically active products, particularly as peripheral vasodilators and hypotensives. When compared with the heretofore known products having a similar activity, the present compounds, having a higher therapeutic index allow the use of higher doses in the disease treatment, with more prompt and more reliable effects without any side effects; moreover, they can be more widely applied to related diseases.

The main object of the present invention is to provide novel substituted alkanol-thio-alkyl-amines according to formula (I), and salts thereof.

It is another object of the invention to provide pharmaceutical preparations containing compounds of the formula (I), having a high therapeutic activity and a low acute and subacute toxicity.

Another object of the invention is to provide products having a peripheral vasodilating activity and an hypotensive activity.

Another object of the invention is to provide products having an activity, against arrhythmia and tachycardia.

Another object of the present invention is to provide products having an hypolipemic and hypocholesterolemic activity.

Another object of the invention is to provide pharmaceutical preparations containing as active substances the compounds according to the present invention, which preparations can be administered either orally or by injection.

A still further object of the present invention is to provide the methods for preparing the substituted alkanol-thio-alkyl amines of the above formula (I), and salts thereof.

Further objects and advantages will become more apparent from the following description and examples.

The products according to the present invention are useful pharmaceutical products, particularly as peripheral vasodilators, with myolithic antispastic activity, particularly in respect of smooth muscles of small arteries. They inhibit the smooth muscles contractions induced by pituitary hormones as vasopressin (pituitrin), and barium chloride. They show a papaverinelike activity and an increase in kidney and brain blood supply. The products according to the present invention have also shown hypotensive activity and, as broadly mentioned above, a very low toxicity.

The therapeutic use thereof is particularly suitable in the diseases of peripheral circulation and in vasoconstriction of arteriolar branches and vasa vasorum.

Said compounds are active in the microangiopathies of different pathogenesis (diabetes, arteriosclerosis, angioneurotic diseases), coronary artery diseases and in general alterations of the microcirculation.

In particular 1-(4'-oxyphenyl)-2-(3'-phenylthio-propyl-amino)-propan-1-ole chlorohydrate, (ITD) has shown in combination with an activity as a peripheral vasodilator and hypotensive a strong activity against experimental arrhythmia and tachycardia. 1-(4'-oxyphenyl)-2-(2-phenylthio-ethyl-amino)propan-1-ole, (NTD) is able to lower the triglycerides and cholesterol level in blood thus acting as an antilipemic and anticholesterol agent.

| mmg/kg | DL50 | DML | ED50 | I.T. |
|---|---|---|---|---|
| TD | 500 | 250 | 30 | 16 |
| ITD | 150 | 75 | 3 | 50 |
| NTD | 200 | 125 | 6 | 33 |

DL50 = Lethal dose 50%
DML = Minimal lethal dose
ED50 = Effective dose 50%
IT = Therapeutic index (DL50/ED50)
TD = 1-(4'-oxyphenyl)-2-(1'-methyl-2'-phenylthio-ethyl-amino)-propan-1-ole chlorohydrate.

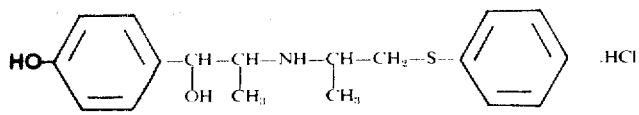

ITD = 1-(4'-oxyphenyl)-2-(3'-phenylthio-propyl-amino)-propan-1-ole chlorohydrate

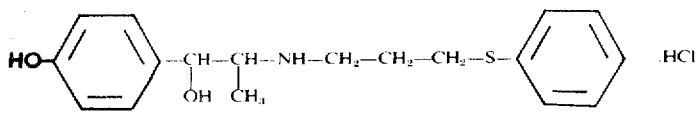

NTD = 1-(4'-oxyphenyl)-2-(2-phenylthio-ethyl-amino)-propan-1-ole

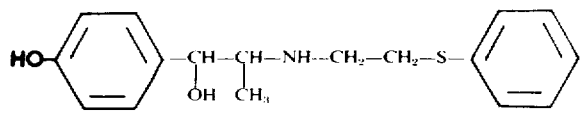

The utility as peripheral vasodilators is confirmed by pharmacological tests on rats, cats, dogs and rabbits. In medical use the compound according to the present invention are incorporated in pharmaceutical preparations containing at least 0.1% active substance and a pharmaceutical carrier.

In the preparations, such compounds may be the only active ingredient, or may be associated with other ingredients. The pharmaceutical preparations may be in the form of tablets for oral use, or in a liquid form for oral use, such as drops, or for injection. A liquid for drop use may be prepared, for example, by dissolving in distilled water a compound according to the present invention together with sodium disulphite, methyl paraoxybenzoate, ethyl paraoxybenzoate, propyl paraoxybenzoate and a small amount of 96% ethanol.

Tablets for oral use may be prepared by mixing a compound according to the present invention, for example with lactose, sucrose, potato starch and talc.

The sterile injectable aqueous solution may be prepared by dissolving a compound according to the present invention in sterile water or in glycerine and diluting with distilled water.

The compounds according to the present invention having the general formula:

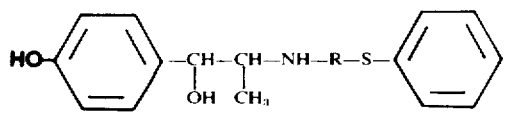

wherein R represents a group selected from —CH$_2$—CH$_2$—, —CH$_2$—CH$_2$—CH$_2$— and

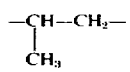

may be prepared from a primary amine of the formula:

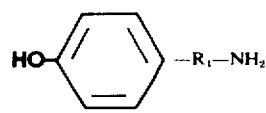

wherein R$_1$ represents a group selected from:

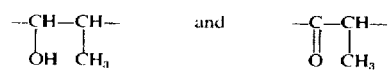

and from an oxo compound selected from:

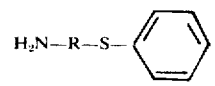

Alternatively, the products of the present invention may be prepared from a primary amine of the formula:

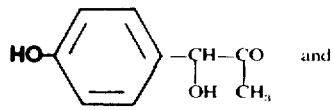

wherein R has the meaning above indicated with an oxo compound selected from:

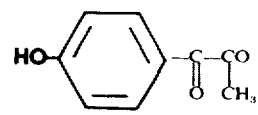

The method according to the present invention is carried out in two steps: the first step is characterized by an addition reaction between the primary amine group which is present on one of the two reactants and the carbonyl group which is present in the other of the two reactants to form an addition compound of Schiff base type; in the second step, the addition product is subjected to hydrogenation, either directly, just as formed or after separation and purification. Thus, during the hydrogenation step, besides the reduction of the double bond present in the addition product, also the reduction of any present CO group to hydroxy group takes place.

Instead of starting from the free amine, it is possible to start from a salt of the amine with a weak acid for instance acetate, benzoate, propionate or carbonate. The addition reaction between the primary amine and the oxo-compound may be carried out in the absence of solvents; however it is preferred to carry out the reaction in the presence of anhydrous solvents. Examples of suitable solvents are aliphatic alcohols such as methanol, ethanol, propanol, isopropanol, aliphatic or aromatic ethers such as dimethyl or diethyl ether, anisole, phenetole, aliphatic or aromatic hydrocarbons such as ligroin, petroleum ether, decaline, kerosene, benzene, toluene. Also an excess of one of the reactants with respect to the stoichiometric amount may act as a solvent.

The addition reaction is preferably carried out at 30°-120° C, at atmospheric pressure for a period of time of 5-50 hours. The pH of the medium is not critical.

The hydrogenation of the addition compound obtained in the first step may be carried out on the reaction mixture resulting from the condensation reaction without any separation and purification of the condensation product. The hydrogenation is carried out with hydrogen in the presence of a metal catalyst according to several known methods such as in the presence of noble metals or Raney-Nickel. The hydrogenation may be carried out at ordinary temperature and pressure. However when the hydrogenation is carried out in the presence of Nickel-Raney it may be convenient to operate in the range of from 15° to 100° C at a pressure in the range of from 2 to 100 atm.

In the case that in the addition compound resulting from the first step of the process, an oxo group is present, the latter has to be converted to hydroxy group. Usually the reduction of the oxo group to hydroxy group takes place during and concomitantly with the hydrogenation of the condensation products (Schiff base type compound). It is however possible to carry out the hydrogenation under such condition that the addition compound is hydrogenated without effecting the oxo group. In this case the ketoamine thus resulting is separated and reduced to amino alcohol according to known methods, for instance, with alkali metals and alcohols, complex metal hydrides, sodium borohydride or aluminum isopropylate. Another alternative process for preparing the products of the invention is by condensation of a primary amine (or salt thereof) of the formula:

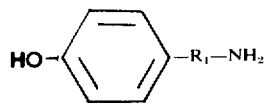

with an halocompound of the formula:

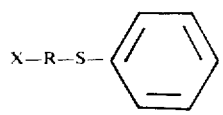

or by condensation of a primary amine (or a salt thereof) of the formula:

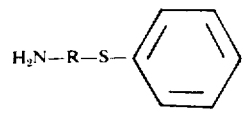

with a halocompound of the formula:

wherein R and $R_1$ have the meaning given above and X represents an halogen atom selected from chlorine, bromine and iodine, in the presence of an acid binding agent.

This alternative method for the preparation of the products according to the present invention is carried out by mixing the reactants at a temperature in the range of from 30° to 150° C, in the presence of an acid binding agent, under an atmosphere of dry nitrogen, and preferably in the presence of inert solvents.

In the case that $R_1$ contains an oxo group, also the condensation product will contain the oxo group which has to be converted to —OH group. The reduction of the oxo group can be carried out according to known techniques by catalytic hydrogenation in the presence of noble metals, or Raney-Nickel or by reduction with alkali metals and alcohols or by means of a complex metal hydride for instance sodium boron hydride or lithium aluminum hydride or with aluminum isopropylate according to Meerwein-Penndorf, with or without a solvent.

In all the above methods the OH group attached to the phenyl nucleus present in one of the two reactants may be free or etherified or esterified for protection purpose. The protecting group should be selected among those which can be easily removed by chemical means at the end of the process under conditions in which the structure of the compounds according to the invention does not undergo to splitting reactions. An example of a convenient etherifying agent is benzyl alcohol which, at the end of the process can be removed by catalytic hydrogenation in the presence of finely divided platinum or palladium, or Raney-Nickel, or by reduction, with complex metal hydride, for example, lithium hydride, aluminum hydride, sodium borohydride.

Thus it is possible to remove the etherifying group contemporaneously with the hydrogenation of the double bond of the Schiff base type compounds cited above, and with the hydrogenation of any oxo group present which has to be converted to hydroxy group. Examples of esterifying agents are acetic, propionic and benzoic acids, which at the end of the process can be removed by saponification with acids, such as hydrochloric or sulphuric acid in a diluted alcoholic or aqueous solution, or by hydrolysis at 10°-100°C with a 0.05-1.5 N aqueous or alcoholic solution of sodium, potassium, calcium, or barium hydroxide.

The alkanol-thio-alkyl-amines of the present invention may be converted to salts with strong acids since the salts so obtained are more soluble in water and more stable to air oxidation than the amines themselves

EXAMPLE 1

Preparation of
1-(4'-oxyphenyl)-2-(1'-methyl-2'-phenyl-thio-ethyl-amino)-propan-1-ole-chlorohydrate

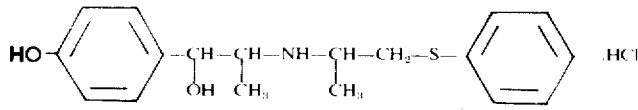

2 g solution of alpha-(1-amino-ethyl)-p-oxybenzyl alcohol and 1.9 g phenyl-thio-acetone in 50 ml absolute alcohol are refluxed for 12 hours.

After evaporation of the solvent, the residue is dissolved in 30 ml of anhydrous tetrahydrofurane. The solution is then slowly added to an aluminum hydride solution in 20 ml tetrahydrofurane while maintaining the temperature at 0° C. After 30 minutes the reaction mixture was hydrolyzed with 5 ml tetrahydrofurane-water (1:1).

The suspension is filtered and the solution brought to dryness; the residue is retaken with 2N hydrochloric acid and then extracted three times with ether.

After vacuum evaporation of the ether still present in the solution, the acid solution is basified with 2N ammonia. The doughy precipitate obtained is retaken with 2N hydrochloric acid and water to solution.

The product crystallizes out by rest of the acid solution, m.p. 202°C.

EXAMPLE 2

Preparation of
1-(4'oxyphenyl)-2-(1'-methyl-2'-phenyl-thio-ethyl-amine)-propan-1-ole chlorohydrate A solution of 8.3 g 1-methyl-2-phenyl-thio-ethylamine and 8.15 g 1-(4'oxyphenyl)-propandione 1,2 in 150 ml absolute ethyl alcohol was refluxed for 15 hours. The solvent was removed and the residue added with 150 ml tetrahydrofurane. The solution was added with lithium hydride and aluminum hydride at 0° C. After 45 minutes the mixture was hydrolyzed with a small amount of water. The suspension was filtered and the filtrate brought to dryness and added with 25 ml 2N HCl. After extraction with diethyl ether the product precipitated by rest as chlorohydrate, m.p. 200°–202°C.

EXAMPLE 3

1-(4'-oxy-phenyl)-2-(2'-phenyl-thio-ethyl-amino)propan-1-ole

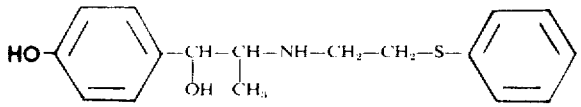

7.8 g alpha-1-amino-ethyl-p-oxy-benzyl alcohol in 120 ml isopropyl alcohol and 9.6 g triethyl amine were introduced into a three-neck flask provided with a cooler, dropping funnel and gas supply tube, and heated under reflux to complete solution. Under a current of $N_2$, 15.2 g phenyl-thiobromoethane (obtained by bromination of 2 phenyl-thio-ethanol) in 25 ml isopropyl alcohol were slowly (3–4 hours) added to the boiling solution; the mixture was then refluxed for 24 hours and then allowed to rest for 12 hours at room temperature. Triethyl amine bromohydrate was filtered off from the solution. The solution was concentrated to a small volume (50 ml) and the residue treated with water and hydrochloric acid to acid reaction. The solution so obtained was extracted few times with ether. The dissolved ether was removed by gentle heating under vacuum, and thereafter the solution was basified with 2N ammonia until no more precipitation appeared.

The free base so obtained was a dense mass which was separated, washed a few times with water and dissolved in ethyl ether. After a few washes with water, the ether solution was dried for 4 hours on anhydrous sodium sulphate and then brought to dryness. The residue was retaken with a small amount (20 ml) of anhydrous ether. By rest or seeding, the free base precipitates from the solution. The product absorbs moisture from the air. Yield 3 g (20%). When dried on phosphoric anhydride, m.p. 98°–99°C.

Analysis: Found C, 66.80%; H, 6.96%, N, 4.49%: for $C_{17}H_{21}NO_2S$: Calculated C, 67.25%; H, 6.97%; N, 4.62%: $\epsilon(\lambda max. 2550 A) = 7444$.

EXAMPLE 4

1-(4'-oxyphenyl)-2-(1'-methyl-2'-phenyl-thio-ethyl-amino)-propan-1-ole chlorohydrate

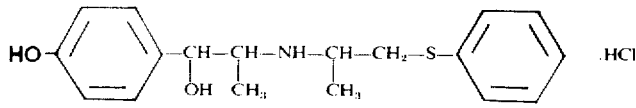

One of the two starting reactants, namely 1-phenyl-thio-2-bromo propane, was previously prepared by cold reacting 1-phenyl-thiopropan-2-ole (30 g) in benzene solution (90 ml) with phosphorous tribromide (12.3 g), dissolved in benzene (60 ml) and allowing the mixture to rest for 4 hours at room temperature, then refluxing for 1½ hours, then pouring on ice and washing the organic phase with water to remove the acidity, evaporating the benzene and distillating the residue at a reduced pressure. Yield 37.5 g (85%), b.p. 0.3 mm/Hg, 82°–83°C.

Analysis: found Br 34.079% for $C_9H_{11}BrS$, calculated: Br 34.57%.

In a three-neck flask, provided with a dropping funnel, cooler and dry $N_2$ supply tube, a hot solution of alpha-(1-aminoethyl)-p-oxy-benzyl alcohol (20 ml) in ispropyl alcohol (250 ml) was added, under a stream of dry $N_2$, with 24.5 g triethylamine and then, within 4 hours time, with 40 g 1-phenyl-thio-2-bromopropane newly distilled. Thereafter the solution was heated for 24 hours and then allowed to rest for another 12 hours at room temperature, thus causing the precipitation of triethylamine bromohydrate which was separated by filtration. The major portion of the solvent was then removed by evaporation under vacuum to a residue volume of 70–80 ml. The residue, acidified with 2N hydrochloric acid, was diluted with water to 500 ml volume and the acid solution thus obtained was extracted for 3 times with ethyl ether.

The dissolved ether was removed by gentle heating under vacuum then the base was cold precipitated from the solution with ammonia. The base was a highly viscous (sometimes pulverulent) product and was separated by decantation. It was washed several times with water. The doughy mass was dissolved again in 2N hydrochloric acid (150 ml) and water to a total 600 ml volume. By resting (2 days) at room temperature, the expected product (m.p. 193°–195°C) slowly precipitated in an amount of 8.5 g (22% yield). The product, after crystallization from water (8.5 g in 100 ml $H_2O$) in the presence of carbon black melted at 198°C.

The same final result could be attained by operating in accordance with the above described modified form: in this case, the process would be as follows:

At a first stage, a mixture of 4.7 g (0.028 mole) 2-(phenyl-thio)-isopropylamine and 4.6 g (0.014 mole) alpha-bromo-p-benzoyloxy-propiophenone in 100 ml benzene is refluxed for 5–6 hours, then benzene was distilled off under reduced pressure to half the initial volume. The residue is added with 50 ml anhydrous ether and after half a day of rest at cold, 2-(phenyl-thio)-isopropyl amine bromohydrate (m.p. 159°–161°C) precipitates and is removed by filtering. By bubbling hydrogen chloride in the solution until saturation, para-benzoyloxy-alpha-(1'-methyl-2'-phenyl-thio-ethyl-amino)-propiophenone chlorohydrate precipitates from the solution and is filtered, washed with benzene or crystallized with water-alcohol. (m.p. 197°–202°C; yield 35%.

Analysis: Found C, 65.67%; H, 5.525; N, 3.02% for $C_{25}H_{26}O_3NSCl$: calculated C, 65.79%; H, 5.92%; N, 3.07%.

In a second stage, the product so obtained (0.49 g) is dissolved in absolute ethyl alcohol; then, cautiously and by small portions, 0.76 g (0.02 mole) boron-sodium hydride are added under stirring and refluxing for 3–4 hours.

After cooling, 2 ml water are added and the mass is again heated for half an hour. The solution is cooled and acidified with 3N hydrochloric acid.

The inorganic product is filtered off and washed with alcohol. From the solution so obtained, the alcohol and part of the water are evaporated. The solution is allowed to rest at cold for one day.

A compound precipitates, m.p. 150°–155°C (0.2 g). The latter is treated with a diluted sodium carbonate solution and extracted with ether. Hydrogen chloride is bubbled in the ether solution thus, a product precipitates, m.p. 183°–186°C, which upon crystallization from water melts at 198–199° C.

Analysis: Found C 61.28%, H, 7.14%: N, 4.01%; for $C_{18}H_{23}NO_2S \cdot HCl$: Calculated C, 61.24%; H, 6.85%: N, 3.96%.

$\epsilon$ ($\lambda$max 2,530 A) = 6306.

EXAMPLE 5

1-(4'-oxyphenyl)-2-(3'-phenyl-thio-propyl-amino)-propan-1-ole chlorohydrate

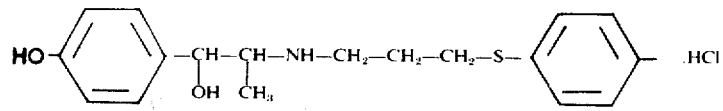

The operation is carried out as described in Examples 3 and 4. A boiling solution of 7 g alpha-(1-amino-ethyl)-p-oxybenzyl alcohol and 8.53 g triethylamine in 125 ml isopropyl alcohol is added with 14.57 g 1-phenyl-thio-3-bromo-propane in 25 ml isopropyl alcohol within 4 hours. After refluxing for 24 hours and rest for 12 hours at room temperature, an abundant triethylamine bromohydrate precipitate is obtained and separated by filtration. The filtrate is evaporated to a small volume, then acidified with 2N HCl and diluted with water. Then the acid solution is extracted 2 times with ether and then subjected to vacuum to remove the ether dissolved. The solution is then made alkaline at cold with 2N ammonia; the dense product obtained is dissolved in ether and the ether phase is washed with water and dried on $Na_2SO_4$.

Thereafter, the anhydrous ether solution is subjected to a stream of hydrogen chloride, and thus the chlorohydrate precipitates and appears partly doughy.

The latter, after washing with a small amount of hot anhydrous acetone, is crystallized from absolute ethyl alcohol-ether. The product, is obtained in an amount of 3.2 g (20% yield) and has m.p. 149°–150°C.

Analysis: Found, C, 60.78%; H, 6.73%; N, 4.08%; for $C_{18}H_{23}NO_2S \cdot HCl$: Calculated: C, 61.09%; H, 6.84%; N 3.96%.

$\epsilon$ ($\lambda$max. 2540 A) = 7939

What I claim is:

1. Substituted alkanol-thio-alkyl-amines having the formula:

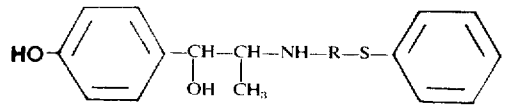

wherein R represents a group selected from $-CH_2-CH_2-$, $-CH_2-CH_2-CH_2-$ and

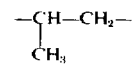

and salts thereof.

2. The substituted alkanol-thio-alkyl-amines of claim 1 in the form of their hydrogen chloride or hydrogen sulfate salt.

3. The alkanol-thio-alkyl-amine of claim 1 being 1-(4'oxyphenyl)-2-(2'-phenyl-thio-ethyl-amine)-propan-1-ole of the formula:

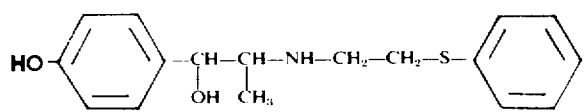
4. The alkanol-thio-alkylamine of claim 1 being 1-(4'-oxyphenyl)-2-(1'-methyl-2'-phenyl-thio-ethylamine) propan-1-ole chlorohydrate of the formula:
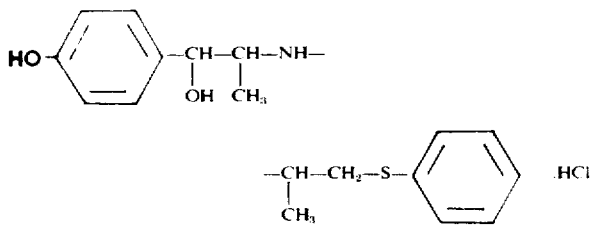
5. The alkanol-thio-alkylamine of claim 1 being 1-(4'-oxyphenyl)-2-(3'-phenyl-thio-propyl-amino)-propan-1-ole chlorohydrate of the formula:
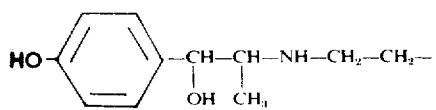
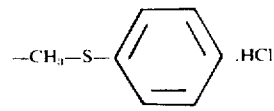
* * * * *